US012600467B2

(12) United States Patent
Nguyen et al.

(10) Patent No.: US 12,600,467 B2
(45) Date of Patent: Apr. 14, 2026

(54) AIRCRAFT LANDING GEAR PROVIDED WITH A LEAF SPRING LOCKING DEVICE

(71) Applicant: SAFRAN LANDING SYSTEMS, Velizy-Villacoublay (FR)

(72) Inventors: Nicolas Nguyen, Moissy-Cramayel (FR); Thierry Blanpain, Moissy-Cramayel (FR); Bertrand Euzet, Moissy-Cramayel (FR)

(73) Assignee: SAFRAN LANDING SYSTEMS, Vélizy-Villacoublay (FR)

( * ) Notice: Subject to any disclaimer, the term of this patent is extended or adjusted under 35 U.S.C. 154(b) by 39 days.

(21) Appl. No.: 18/574,569

(22) PCT Filed: Jun. 24, 2022

(86) PCT No.: PCT/EP2022/067445
§ 371 (c)(1),
(2) Date: Dec. 27, 2023

(87) PCT Pub. No.: WO2023/274896
PCT Pub. Date: Jan. 5, 2023

(65) Prior Publication Data
US 2024/0294250 A1 Sep. 5, 2024

(30) Foreign Application Priority Data
Jun. 28, 2021 (FR) ...................................... 2106886

(51) Int. Cl.
B64C 25/20 (2006.01)
B64C 25/26 (2006.01)
(52) U.S. Cl.
CPC .............. B64C 25/20 (2013.01); B64C 25/26 (2013.01)

(58) Field of Classification Search
CPC ........ B64C 25/10–14; B64C 25/18–20; B64C 25/26
See application file for complete search history.

(56) References Cited

U.S. PATENT DOCUMENTS

| | | | |
|---|---|---|---|
| 9,862,483 B2 | 1/2018 | Schmidt | |
| 2015/0203192 A1 | 7/2015 | Slanker | |
| 2016/0272305 A1* | 9/2016 | Schmidt | .................. B64C 25/10 |

FOREIGN PATENT DOCUMENTS

| | | |
|---|---|---|
| EP | 3 495 263 A1 | 6/2019 |
| EP | 3 875 367 A1 | 9/2021 |
| WO | 2009/109771 A2 | 9/2009 |

OTHER PUBLICATIONS

International Search Report mailed Sep. 19, 2022, issued in corresponding International Application No. PCT/EP2022/067445, filed Jun. 24, 2022, 6 pages.

(Continued)

*Primary Examiner* — Joshua J Michener
*Assistant Examiner* — Colin Zohoori
(74) *Attorney, Agent, or Firm* — CHRISTENSEN O'CONNOR JOHNSON KINDNESS PLLC

(57) ABSTRACT

An aircraft landing gear includes a strut mounted to an aircraft structure and moveable between extended and retracted positions. A bracing member includes a first bracing connecting rod hinged to the aircraft structure and a second bracing connecting rod hinged to the first bracing connecting rod and to the strut. A stabilizing member includes a first stabilizing connecting rod and a second stabilizing connecting rod hinged together. The second connecting stabilizing rod is hinged to the first bracing connecting rod. At least one spring is arranged to be resiliently subjected to a bending force when the hinges of the first and second stabilizing connecting rods move from their aligned position.

9 Claims, 7 Drawing Sheets

(56) References Cited

OTHER PUBLICATIONS

Written Opinion mailed Sep. 19, 2022, issued in corresponding International Application No. PCT/EP2022/067445, filed Jun. 24, 2022, 6 pages.

* cited by examiner

AIRCRAFT LANDING GEAR PROVIDED WITH A LEAF SPRING LOCKING DEVICE

FIELD OF THE DISCLOSURE

The present disclosure relates to the field of landing gears and more specifically, means making it possible to lock the landing gear in the extended position.

BACKGROUND

Aircraft landing gears comprising a strut mounted on a structure of an aircraft so as to move between an extended position (for takeoff and landing) and a retracted position (for the flight) under the action of an operating actuator are known.

The strut is held in the extended position by a breaker strut which is coupled to the strut and to the structure of the aircraft, and which comprises two connecting rods hinged together and held in an aligned position by a stabilizing member.

The stabilizing member comprises two connecting rods hinged together and held in a substantially aligned position by a passive locking member in order to prevent the misalignment of the strut.

Generally, the locking member comprises one or more helical springs having ends connected to the strut and to the stabilizing member to exert a traction force on the stabilizing member and thus prevent the misalignment of the connecting rods.

It is common that the landing gear is arranged to be moved by gravity of the retracted position to the extended position in case of failure of the operating actuator. The helical springs are generally provided to assist the movement of the landing gear to the extended position and to lock it in this position.

This being the case, the helical springs are particularly bulky and oppose the action of the operating actuator during the lifting of the landing gear, their linear performance involving additional significant forces to be countered during the movement of the landing gear to the retracted position for which the operating actuator must be sized.

What is more, the helical springs have a limited radial stiffness, and have proved to be particularly vulnerable to impacts of birds and other debris generated, for example, during the bursting of a tire. They can also suffer a fatigue failure due to the vibrations conferred by the operation of the landing gear or aerodynamics effects, and interfere with parts close by.

The disclosure therefore aims to propose an aircraft landing gear at least partially preventing the abovementioned disadvantages.

SUMMARY

To this end, an aircraft landing gear is proposed, comprising:
  a strut arranged to be mounted on an aircraft structure so as to move between an extended position and a retracted position;
  at least one bracing member to hold the strut in the extended position, comprising a first connecting rod hinged on the aircraft structure, and a second connecting rod hinged on the first connecting rod and on the strut;
  a stabilizing member to hold the first and second connecting rods in the aligned position, comprising a first connecting rod and a second connecting rod hinged together, and the second connecting rod of which is hinged on the first connecting rod; and
  at least one spring to resiliently return the hinges of the first and second connecting rods into the generally aligned position.

According to the disclosure, the spring is a leaf spring arranged to be brought into a resiliently deformed state under a bending force when the hinges of the first and second connecting rods move from their generally aligned position, and to avoid being subjected to the bending force and be in a lesser deformation state, when the strut is between the retracted position and an intermediate position comprised between the retracted position and the extended position.

Thus, the bending force to which the spring is subjected, only temporarily opposes the lifting of the strut 2, which makes it possible to limit the forces to be countered during the movement of the landing gear to the retracted position for which an operating actuator must be sized.

Moreover, the leaf springs have proved to be less vulnerable to the impacts of birds and debris generated by the bursting of a tire than the helical springs. They also have a lesser bulk, which facilitates their integration.

According to a particular embodiment of the disclosure, the leaf spring has an end rigidly fixed to the first connecting rod, and an opposite end permanently bearing on a first arm of a pivoting arm mounted rotatably free about the hinge axis of the first connecting rod and of the second connecting rod. The pivoting arm is rotatably linked to the first connecting rod when the strut is between the retracted position and the intermediate position, and rotatably linked to the second connecting rod when the strut is between the intermediate position and the extended position.

Specifically, the pivoting arm has a second arm bearing against a surface of the first connecting rod when the strut is between the retracted position and the intermediate position, and bearing against a surface of the second connecting rod when the strut is between the intermediate position and the extended position.

According to a particular feature, the leaf spring is a metal plate having a substantially constant thickness and a width developing mainly linearly.

Specifically, the end of the leaf spring is rigidly fixed to the first connecting rod via a fixing device comprising a base fixed onto the first connecting rod and a blade support fixed to the end of the leaf spring. The fixing support comprises, in the front part, a contact surface arranged to engage with a contact surface of the base and enable a pivoting of the blade support on the base about an axis substantially perpendicular to a longitudinal axis of the leaf spring, and comprises, in the rear part, an oblong hole arranged to be passed through by a screw in order to rigidly fix the blade support to the first connecting rod and enable the pivoting of the blade support during the screwing and unscrewing of the screw.

Specifically, the volume occupied by the leaf spring and the pivoting arm when the strut is in the extended position is contained in the volume swept by the first connecting rod when the strut passes from the retracted position to the extended position.

According to another particular embodiment of the disclosure, the leaf spring has an end rigidly fixed to the second connecting rod, and an opposite end permanently bearing against a sliding profile of a cam mounted rotatably free about the hinge axis of the first connecting rod and of the second connecting rod. The cam is rotatably linked to the second connecting rod when the strut is between the retracted position and the intermediate position, and rotatably linked to the first connecting rod when the strut is between the intermediate position and the extended position.

Specifically, the cam has a rotatably driving surface bearing against a surface of the first connecting rod when the strut is between the intermediate position and the extended position, and bearing against a surface of the second connecting rod when the strut is between the retracted position and the intermediate position.

According to a particular feature, the leaf spring comprises a plurality of superposed blades having a mainly constant width and different lengths.

Specifically, the landing gear comprises two leaf springs to provide a redundancy in case of failure of one of the two leaf springs.

Specifically, the two leaf springs are substantially identical.

The disclosure also relates to an aircraft comprising at least one such landing gear.

DESCRIPTION OF THE DRAWINGS

The disclosure will be best understood in the light of the description below, which is purely illustrative and non-limiting, and must be read regarding the accompanying drawings, among which.

DETAILED DESCRIPTION

Figure 1:
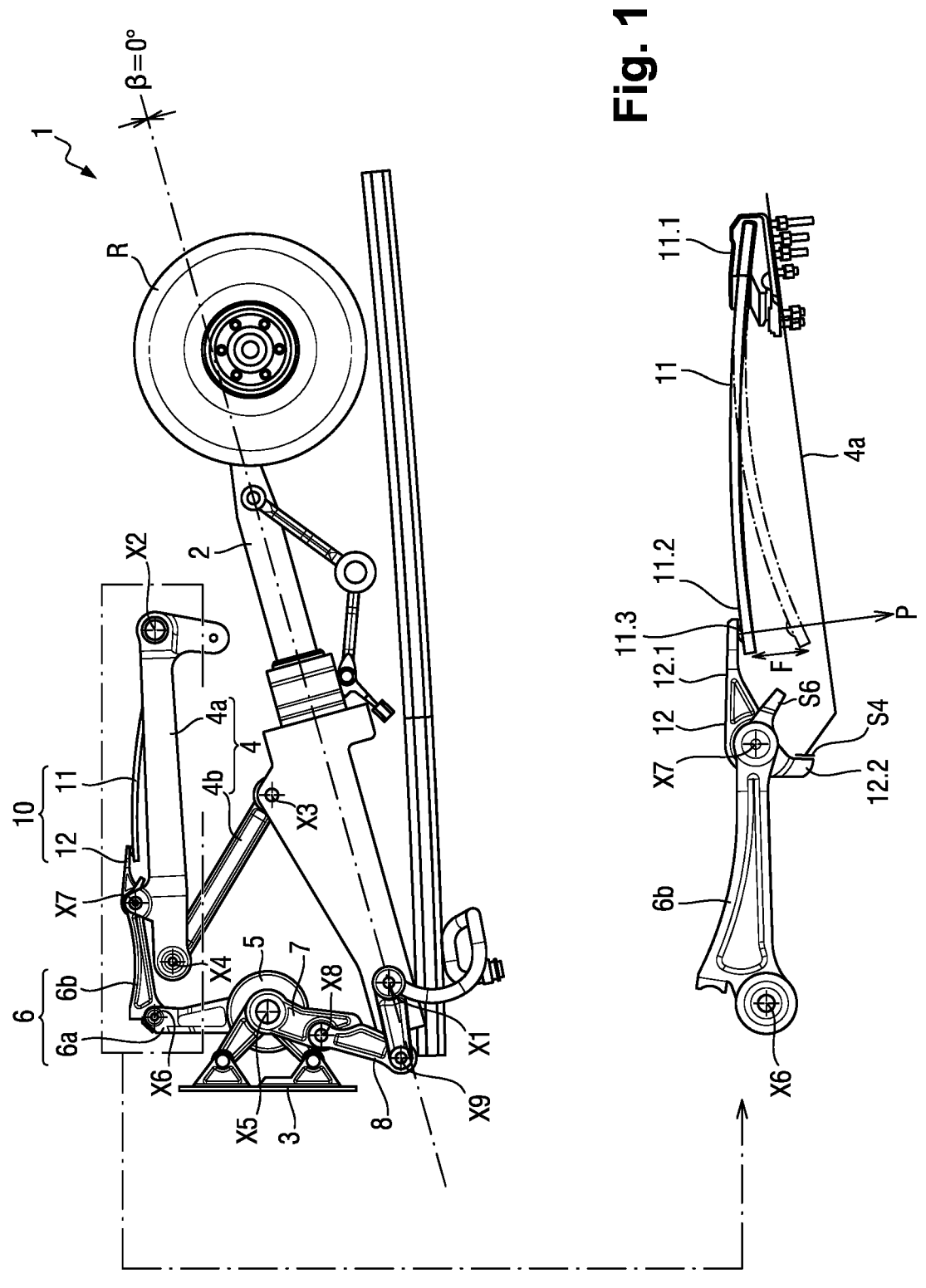
FIG. 1 is a side view of an aircraft landing gear according to a first embodiment of the disclosure, represented in the retracted position.

In reference to FIGS. 1 to 4, an aircraft landing gear 1 comprises, in a manner known per se, a strut 2 having a first end carrying wheels R and, opposite, a second end hinged on a structure 3 of an aircraft about a hinge axis X1 substantially horizontal in service. The strut 2 is movable between a retracted position illustrated in FIG. 1 and an extended position illustrated in FIG. 4. The strut 2 is held in the extended position by means of a bracing member 4 comprising a first connecting rod 4a hinged on the structure 3 of the aircraft about a hinge axis X2 and a second connecting rod 4b hinged on the strut 2 and on the first connecting rod 4a about respective hinge axes X3 and X4. In the extended position, the first connecting rod 4a and the second connecting rod 4b are in a substantially aligned position.

A rotary actuator 5 is mounted rotatably free on the structure 3 of the aircraft about a rotation axis X5 parallel to the hinge axes X1-X4. The actuator 5 comprises a casing provided with an appendix forming a first connecting rod 6a, and comprises a shaft rotatably mounted about the rotation axis X5 and carrying a crank 7. The relative angular position between the first connecting rod 6a and the crank 7 can be modified by powering the actuator 5 to make the shaft rotate relative to the casing. The first connecting rod 6a is coupled to the first connecting rod 4a of the bracing member 4 by means of a second connecting rod 6b hinged on the first connecting rod 6a about a hinge axis X6 and hinged on the first connecting rod 4a about a hinge axis X7. The crank 7 is coupled to the strut 2 by means of another connecting rod 8 hinged on the crank 7 about a hinge axis X8 and hinged on a peak of the strut 2 about a hinge axis X9. All the axes X1 to X9 are, in this case, parallel to one another.

Figure 4:
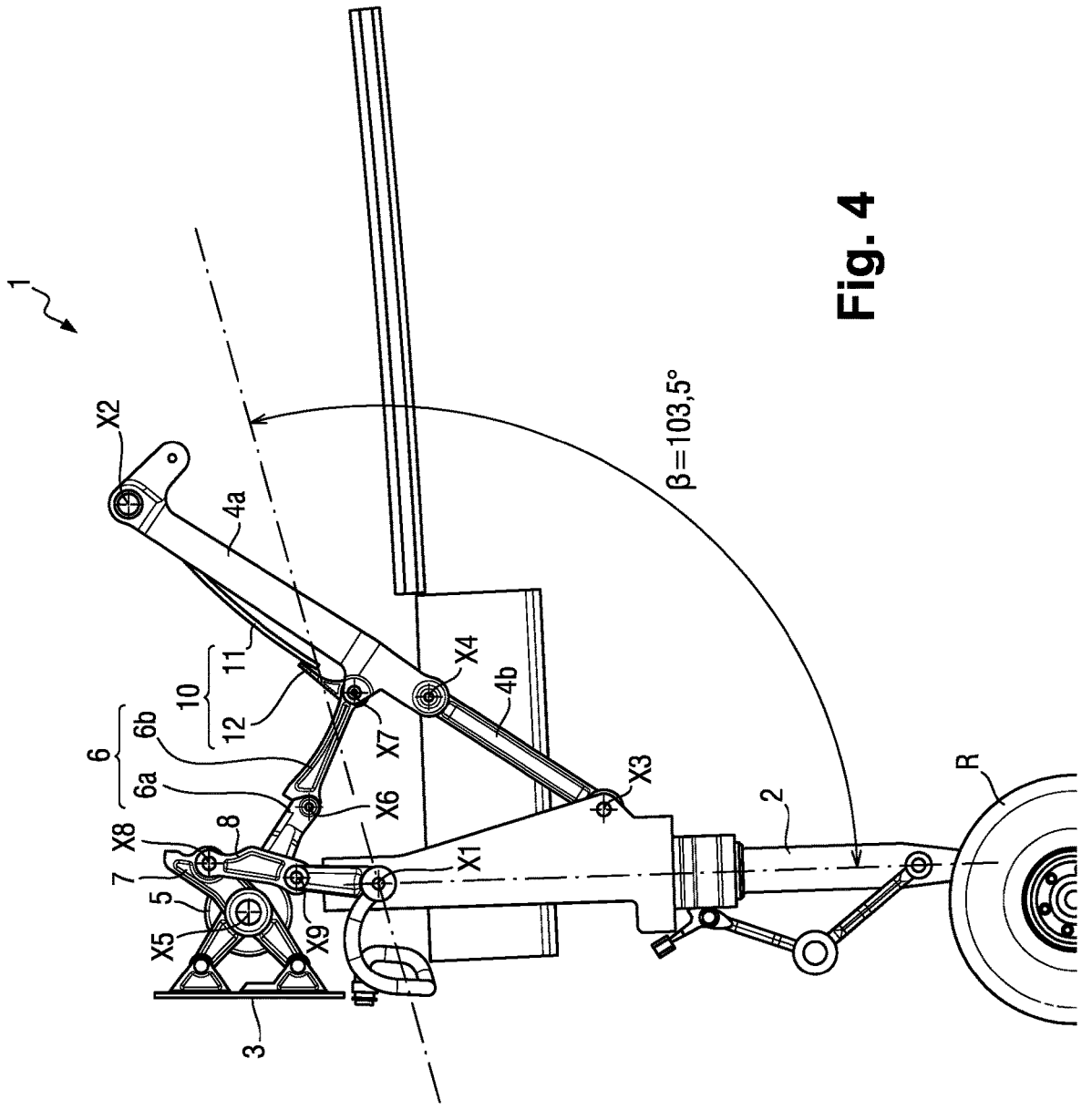
FIG. 4 is a view similar to FIG. 1 showing the landing gear in the extended position.

In the position illustrated in FIG. 4, wherein the strut 2 is in the extended position, the relative angular position of the connecting rod 6a and of the crank 7 is such that the connecting rods 6a, 6b are in a substantially aligned position, called first alignment. In a manner known per se, the first alignment is a position obtained by making the connecting rods 6a, 6b pass slightly beyond their geometric alignment (which is defined by the perfect alignment of the axes X5, X6 and X7 in one same plane) to make them come onto respective abutments. The connecting rods 6a, 6b thus form a stabilizing member 6 making it possible to hold the connecting rods 4a, 4b of the bracing member 4 in a substantially aligned position, and therefore stabilize the strut 2 in the extended position.

Yet, the shaft is blocked by the crank 7, itself rotatably blocked by its coupling to the strut 2 via the connecting rod 8 which is not aligned with the crank 7.

To lift the strut 2 to the retracted position, the actuator 5 is powered to make the shaft rotate and therefore modify the relative angular position of the connecting rod 6a and of the crank 7. As illustrated in FIGS. 2 and 3, this rotation has the first effect of breaking the alignment of the connecting rods 6a, 6b of the stabilizing member 6, and therefore of breaking the alignment of the connecting rods 4a, 4b of the bracing member 4. The strut 2 is therefore no longer stabilized in the extended position and can be lifted to the retracted position. With the actuator 5 continuing to be powered, the second connecting rod 6b pulls on the connecting rod 4a while the connecting rod 8 pushes on the strut 2, which has the effect of making the strut 2 raise to the retracted position illustrated in FIG. 1.

When the strut 2 is in the retracted position, the relative angular position of the connecting rod 6a and of the crank 7 is such that the crank 7 and the connecting rod 8 are in a substantially aligned position, called second alignment. In the same way as for the first alignment, the second alignment is a position obtained by making the crank 7 and the connecting rod 8 pass slightly beyond their geometric alignment (which is defined by the perfect alignment of the axes X5, X8 and X9 in one same plane) to make them come onto respective abutments. This alignment blocks the strut 2 in the retracted position such that this position is stable and does not require the use of a latching box.

According to the disclosure, the connecting rods 6a, 6b are held in a substantially aligned position by a locking member 10 returning the connecting rods 6a, 6b to the locked position illustrated in FIG. 4 and defined by the respective abutments of the connecting rods 6a, 6b.

Figure 5:
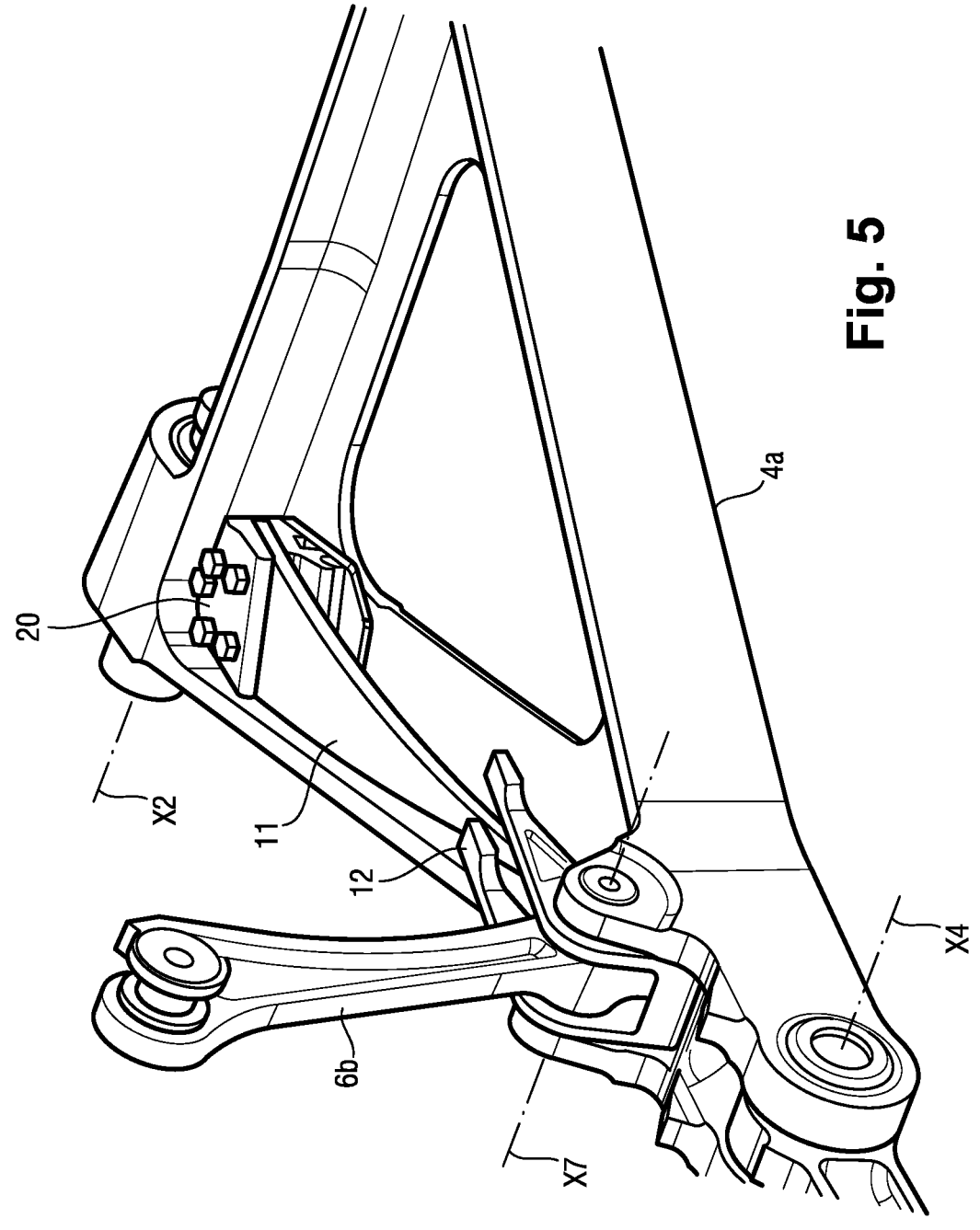
FIG. 5 is a perspective view of a part of the landing gear illustrated in FIG. 4.

The locking member 10 comprises a spring to resiliently hold the connecting rods 6a, 6b in a substantially aligned position. The spring comprises an extended-shaped metal blade 11 which extends along the connecting rod 4a (FIG. 5). The blade 11 in this case has a mainly constant thickness and a developing width, the width extending substantially about the axes X1-X9 and being greater than the thickness.

The width of the blade 11 mainly develops linearly so as to homogenize the mechanical stresses undergone by the blade 11 when this is subjected to the bending force P described below. The blade 11 thus comprises a first end 11.1 of wide width and a second end 11.2 of narrow width. The first end 11.1 is rigidly fixed (embedding-type connection) to the connecting rod 4a in the proximity of the hinge axis X2. The second end 11.2 carries a runner 11.3 disposed in the proximity of the hinge axis X7.

The locking member 10 further comprises a pivoting arm 12 mounted rotatably free about the hinge axis X7 of the bracing member 4. The pivoting arm 12 is substantially L-shaped and comprises a first arm 12.1 of which an end is permanently bearing against the runner 11.3 of the blade 11, and a second arm 12.2 of which an end is bearing against a surface S4 of the connecting rod 4a and/or a surface S6 of the connecting rod 6b along the relative angular position of the connecting rod 4a and of the connecting rod 6b (FIG. 1).

The extension of the strut 2 will now be detailed.

Figure 2:
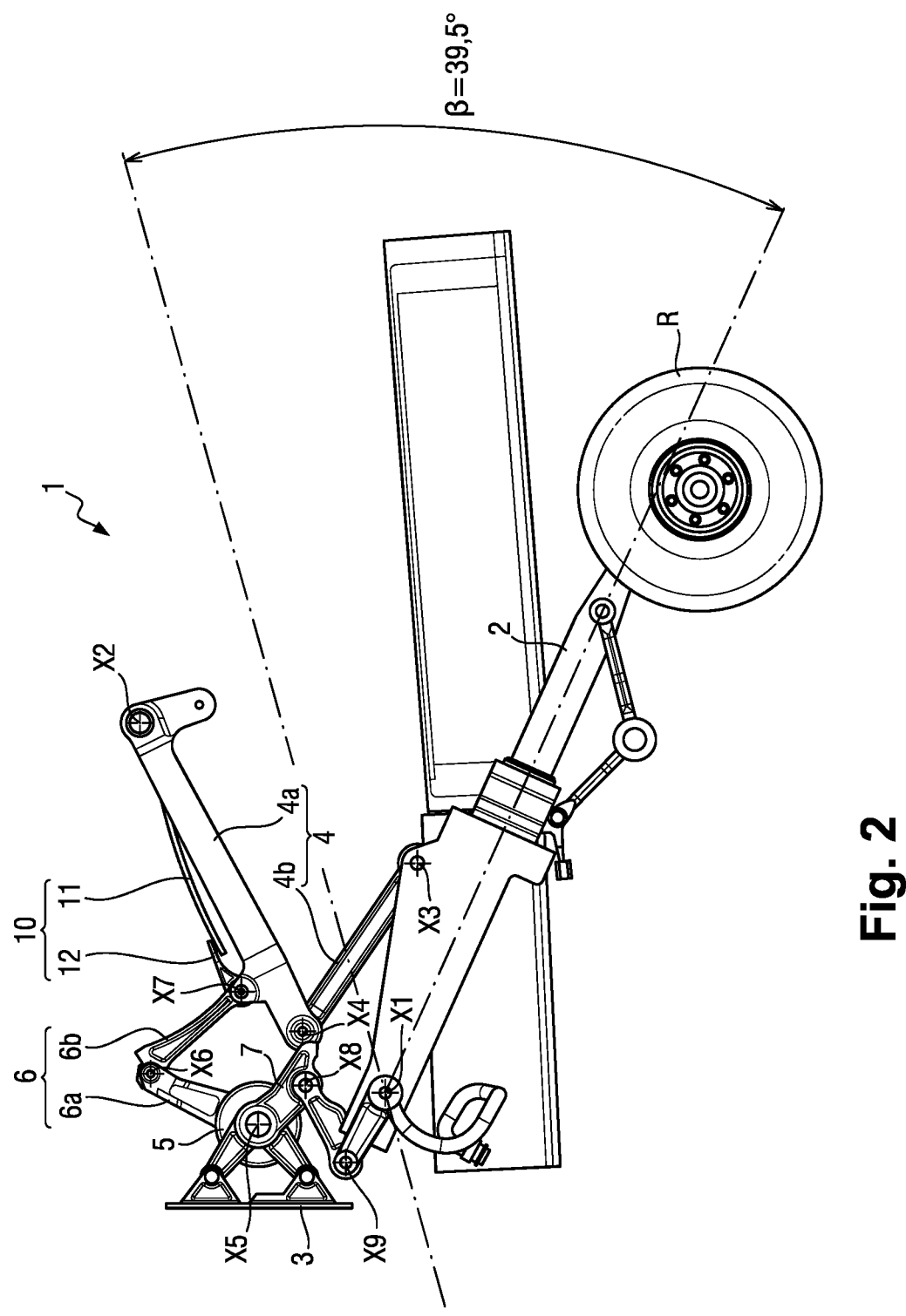
FIG. 2 is a view similar to FIG. 1 showing the landing gear in a first intermediate position at the start of the extension phase.
Figure 3:
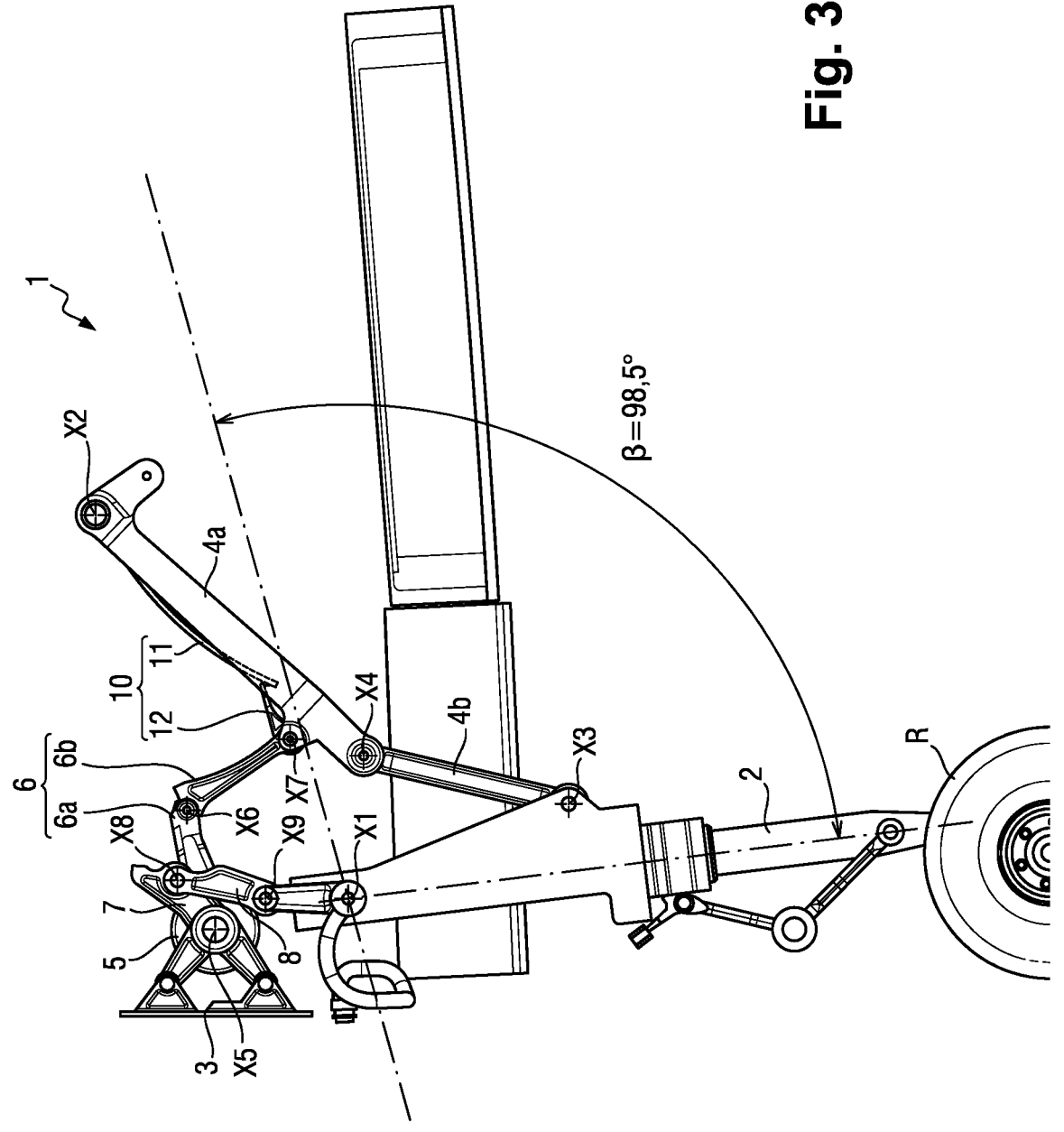
FIG. 3 is a view similar to FIG. 1 showing the landing gear in a second intermediate position at the end of the extension phase.

When the landing gear 1 is between the retracted position illustrated in FIG. 1 (wherein the strut 2 describes an extension angle β equal to) 0° and the first intermediate position illustrated in FIG. 2 (wherein the extension angle β of the strut 2 is substantially equal to) 39.5°, the relative angular position of the connecting rod 4a and of the connecting rod 6b is such that the first arm 12.1 of the pivoting arm 12 bears against the runner 11.3 of the blade 11 while the second arm 12.2 of the pivoting arm 12 only bears against the surface S4 of the connecting rod 4a, such that the pivoting arm 12 and the connecting rod 4a have an integral rotation movement about the axis X7, the blade 11 being slightly bent and having a minimal arrow F.

When the landing gear 1 is in the first intermediate position (FIG. 2), the relative angular position of the connecting rod 4a and of the connecting rod 6b is such that the first arm 12.1 of the pivoting arm 12 bears against the runner 11.3 of the blade 11, while the second arm 12.2 of the pivoting arm 12 bears both against the surface S4 of the connecting rod 4a and against the surface S6 of the connecting rod 6b, such that the arrow F of the blade 11 remains unchanged and is always minimal.

When the landing gear 1 is between the first intermediate position (FIG. 2) and the second intermediate position illustrated in FIG. 3 (wherein the extension angle β of the strut 2 is substantially equal to) 98.5°, the relative angular position of the connecting rod 4a and of the connecting rod 6b is such that the first arm 12.1 of the pivoting arm 12 bears against the runner 11.3 of the blade 11, while the second arm 12.2 of the pivoting arm 12 only bears against the surface S6 of the connecting rod 6b, such that the pivoting arm 12 and the connecting rod 6b have an integral rotation movement about the axis X7, the pivoting arm 12 thus exerting a bending force P on the blade 11, tending to increase as the landing gear 1 moves closer to the second intermediate position, and therefore to lead to an increase of the arrow F of the blade 11.

When the landing gear 1 is in the second intermediate position (FIG. 3), the bending force P exerted by the first arm 12.1 of the pivoting arm 12 on the blade 11 is maximal, such that the arrow F of the blade 11 is maximal.

When the landing gear 1 is between the second intermediate position (FIG. 3) and the extended position illustrated in FIG. 4 (wherein the extension angle β of the strut 2 is substantially equal to) 103.5°, the relative angular position of the connecting rod 4a and of the connecting rod 6b is such that the first arm 12.1 of the pivoting arm 12 bears against the runner 11.3 of the blade 11 while the second arm 12.2 of the pivoting arm 12 always only bears against the surface S6 of the connecting rod 6b, such that the pivoting arm 12 and the connecting rod 6b continue to have an integral rotation movement about the axis X7, which tends to decrease the bending force P exerted by the first arm 12.1 of the pivoting arm 12 on the blade 11 as the landing gear 1 moves closer to the extended position, and therefore to lead to a decrease of the arrow F of the blade 11 which tends to return the connecting rods 6a, 6b to the locked position.

Thus, the blade 11 works resiliently by bending and tends to return to its rest state. To this end, the blade 11 is slightly bent when the connecting rods 6a, 6b are in a substantially aligned position (FIG. 4), and takes a more arced shape when the connecting rod 6b pivots about the axis X7 (FIG. 3).

The blade 11 thus forms a leaf spring resiliently subjected to a bending force P via the pivoting arm 12 when the connecting rods 6a, 6b move from their substantially aligned position. The arrangement of the pivoting arm 12 makes it possible to temporarily link the bending force P exerted on the blade 11 to the rotation of the connecting rod 6b, and therefore to limit the force to be provided by the actuator 5 during the retraction of the strut 2.

The actuator 5 is sized to break the alignment of the connecting rods 6a, 6b by countering the bending force P exerted by the pivoting arm 12 on the blade 11. The misalignment of the connecting rods 6a, 6b generates the misalignment of the connecting rods 4a, 4b and therefore the pivoting of the strut 2 to the retracted position.

It will be noted that whatever the position of the landing gear 1, the blade 11 is held by the pivoting arm 12 in a state at least of minimal deformation so as to ensure a permanent contact between the blade 11 and the pivoting arm 12 and thus avoid any detachment due to vibrations during the flight.

It will also be noted that the volume occupied by the blade 11 and the pivoting arm 12 when the landing gear 1 is in the extended position is contained in the volume swept by the connecting rod 4a when the landing gear 1 passes from the retracted position to the extended position. Such a locking member 10 does therefore not impact, contrary to helical springs, the integration of other equipment and proves to be particularly protected from external attacks, the blade 11 and the pivoting arm 12 being arranged in the storage box of the landing gear 1 and the connecting rod 4a acting as a shield against the trajectories of birds and projections of tire debris (FIG. 5).

Figure 6:
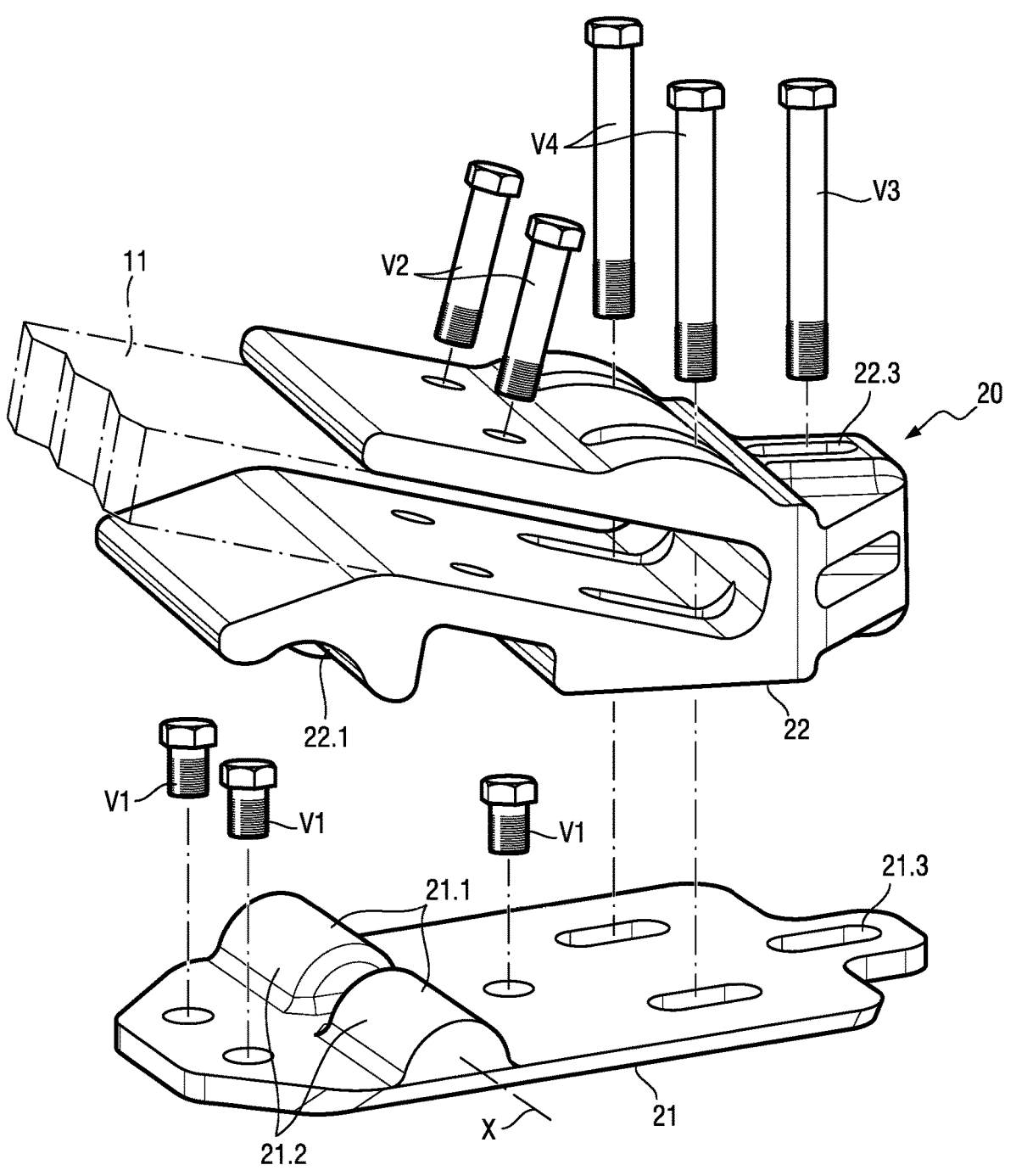
FIG. 6 is a perspective view of a device for fixing the leaf spring onto the bracing member.

FIG. 6 illustrates a device 20 for fixing the blade 11 on the connecting rod 4a, making it possible to facilitate the removal and the replacement of the blade 11 mounted pre-stressed on the connecting rod 4a by the pivoting arm 12. The device 20 can also be seen in service in FIG. 5.

The device 20 comprises a mainly flat base 21, arranged to be fixed on the first connecting rod 4a via three screws V1. The base 21 comprises, in the front part, a male contact surface 21.1 formed by two half-cylinders 21.2 extending in projection from an upper surface of the base 21. The two half-cylinders 21.1 extend along one same axis X which, in service, is substantially perpendicular to the longitudinal axis of the blade 11.

The device 20 further comprises a mainly U-shaped blade support 22 to receive the end 11.1 of the blade 11 and be fixed to the blade 11 via two screws V2. The blade support 22 comprises, in the front part, a rounded-shaped female contact surface 22.1, arranged to engage with the male contact surface 21.1 of the base 21 and enable a pivoting of the blade support 22 on the base 21 substantially about the axis X.

The base 21 and the blade support 22 comprise, in the rear part, an oblong hole 21.3, 22.3 arranged to be passed through by one same screw V3 in order to fix the blade support 22, and therefore the blade 11, to the connecting rod 4a and enable a pivoting about the axis X of the blade support 22 on the base 21 during the screwing and the unscrewing of the screw V3.

The screw V3 has a sufficient length such that during its unscrewing, the blade support 22 pivots about the axis X under the effect of the bending force P exerted by the pivoting arm 12 on the end 11.2 of the blade 11, and this until the blade 11 has returned to its rest state. Conversely, the screw V3 makes it possible, during its screwing, to generate and adjust the bending force P exerted by the pivoting arm 12 on the end 11.2 of the blade 11 to pre-stress the blade 11. Once the screw V3 is correctly tightened, two other screws V4 passing through oblong holes provided in the device 20 and the blade 11 are added, which provides a redundancy of the fixing of the blade 11 in case of failure of one of the screws V3, V4.

The dismounting and the replacement of the blade 11 thus does not require the use of specific tools.

Figure 7:
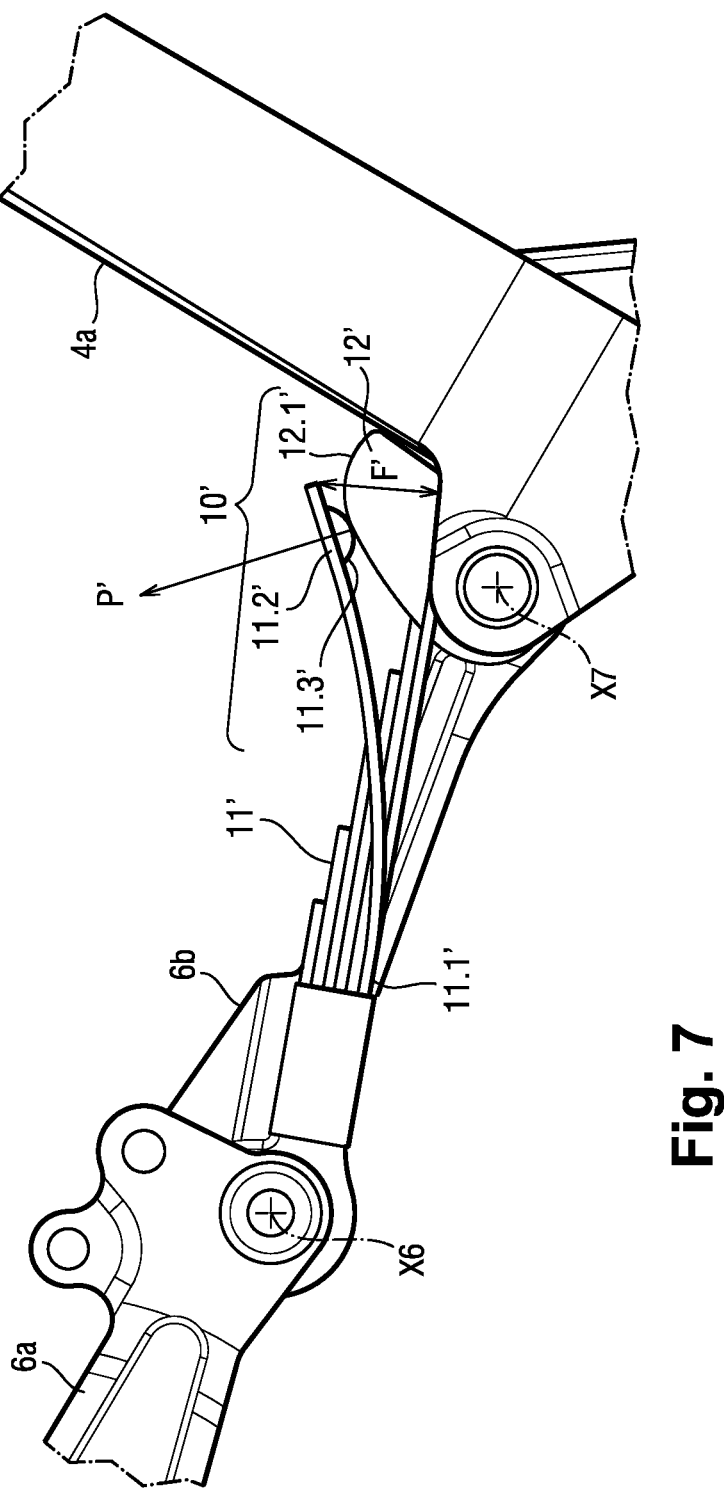
FIG. 7 is a side view of a part of an aircraft landing gear according to a second embodiment of the disclosure, represented in the extended position.

FIG. 7 illustrates another embodiment of the FIGURE disclosure, wherein the landing gear 1 comprises, instead of the locking member 10, a locking member 10' to hold the connecting rods 6a, 6b in a substantially aligned position.

The locking member 10' comprises an extended-shaped spring comprising a plurality of superposed blades 11' extending along the connecting rod 6b. The blades 11' have a mainly constant width and have different lengths so as to homogenize the mechanical stresses undergone by the blades 11' when these are subjected to the bending force P' described below. A first end 11.1' of the spring is rigidly fixed to the connecting rod 6b in the proximity of the hinge axis X6 and a second end 11.2' opposite the first end 11.1' carries a runner 11.3' disposed in the proximity of the hinge axis X7.

The locking member 10' further comprises a cam 12' fixed to the connecting rod 4a, such that the cam 12' and the connecting rod 4a have an integral rotation movement about the hinge axis X7 of the bracing member 4. The cam 12' has a sliding profile 12.1' against which the runner 11.3' permanently bears.

The extension of the strut 2 will now be detailed.

When the landing gear 1 is between the retracted position (FIG. 1) and the first intermediate position (FIG. 2), the sliding profile 12.1' of the cam 12' is such that the distance separating the runner 11.3' from the hinge axis X7 is minimal, such that the blades 11' are slightly bent and have a minimal arrow F'.

When the landing gear 1 is between the first intermediate position (FIG. 2) and the second intermediate position (FIG. 3), the sliding profile 12.1' of the cam 12' is such that the distance separating the runner 11.3' from the hinge axis X7 tends to increase as the landing gear 1 moves closer to the second intermediate position, and therefore to lead to an increase of the arrow F' of the blades 11'.

When the landing gear 1 is in the second intermediate position (FIG. 3), the bending force P' exerted by the cam 12' on the blades 11' is maximal, such that the arrow F' of the blades 11' is maximal.

When the landing gear 1 is between the second intermediate position (FIG. 3) and the extended position (FIG. 4), the sliding profile 12.1' of the cam 12' is such that the distance separating the runner 11.3' from the hinge axis X7 tends to decrease as the landing gear 1 moves closer to the extended position, and therefore to lead to a decrease of the arrow F' of the blades 11' which tends to return the connecting rods 6a, 6b to the locked position.

Thus, the blades 11' work resiliently by bending and tend to return to their rest state. To this end, the blades 11' are slightly bent when the connecting rods 6a, 6b are in a substantially aligned position, and take a more arced shape when the connecting rod 6b pivots about the axis X7.

The blades 11' thus form a leaf spring resiliently subjected to a bending force P' via the cam 12' when the connecting rods 6a, 6b move from their substantially aligned position. The arrangement of the cam 12' makes it possible to temporarily link the bending force P' exerted by the cam 12' on the blades 11' to the rotation of the connecting rod 6b, and therefore to limit the force to be provided by the actuator 5 during the retraction of the strut 2.

The actuator 5 is sized to break the alignment of the connecting rods 6a, 6b by countering the bending force P' exerted by the cam 12' on the blades 11'. The misalignment of the connecting rods 6a, 6b generates the misalignment of the connecting rods 4a, 4b and therefore the pivoting of the strut 2 to the retracted position.

It will be noted that whatever the position of the landing gear 1, the blades 11' are subjected to a bending force P' exerted by the cam 12' so as to ensure a permanent contact between the blades 11' and the cam 12' and thus avoid any detachment due to vibrations during the flight.

It will also be noted that the volume swept by the blades 11' and the cam 12' when the landing gear 1 passes from the retracted position to the extended position is contained in the volume swept by the connecting rod 6b under the same conditions. Such a locking member 10' therefore does not impact the integration of other equipment and has proved to be particularly protected from external attacks, the blades 11' and the cam 12' being arranged in the storage box of the landing gear 1 and the connecting rod 6b acting as a shield against the trajectories of birds and projections of tire debris.

The blades 11' will, for example, be fixed to the connecting rod 6b by a fixing device similar to the fixing device 20, in order to facilitate the removal and the replacement of the blades 11' mounted pre-stressed on the connecting rod 6b by the cam 12' and by using only the standard tooling.

Naturally, the disclosure is not limited to the embodiment described, but includes any variant entering into the field of the disclosure such as defined by the claims.

The number, the shape and the dimensions of the blades 11, 11' can be different from those illustrated. For example, a second blade identical to the blade 11 can be fixed onto the connecting rod 4a symmetrically to the blade 11 and be in permanent contact with the pivoting arm 12 to provide a redundancy in case of failure of one of the two blades. For example again, the blade 11 can have a constant width and/or a developing thickness by having, for example again, a parabolic profile.

Although, in this case, the blade 11 extends along the connecting rod 4a, it can also extend along the connecting rod 6b.

Although, in this case, the blades 11' extend along the connecting rod 6b, it can also extend along the connecting rod 4a.

The stabilization of the strut 2 can also cumulate the action of the pivoting arm 12 and of one or more blades 11 fixed onto the connecting rod 4a with that of the cam 12' and of one or more blades 11' fixed onto the connecting rod 6b.

The blades 11, 11' can be made of any suitable material (metal, composite, etc.).

The blades 11, 11' can be fixed onto the connecting rod 4a and the connecting rod 6b by any suitable means.

Although the strut 2 is, in this case, held in the extended position by one single bracing member 4, the disclosure can also apply to landing gears comprising a strut held in the extended position by several bracing members. At least one of the bracing members is thus equipped with a locking member 10, 10' comprising at least one leaf spring.

The pivoting of the blade support 22 on the base 21 can also be ensured by a female contact surface carried by the base and a male contact surface carried by the blade support.

The invention claimed is:

1. A landing gear for an aircraft, comprising:

a strut configured to be mounted on an aircraft structure so as to move between an extended position and a retracted position;

at least one bracing member configured to hold the strut in the extended position, and comprising a first bracing connecting rod configured to be hingedly coupled to the structure of the aircraft and a second bracing connecting rod hingedly coupled to the first bracing connecting rod and to the strut;

a stabilizing member configured to hold the first and second bracing connecting rods in an aligned position, and comprising a first stabilizing connecting rod hingedly coupled to a second stabilizing connecting rod, the second stabilizing connecting rod being hingedly coupled to the first bracing connecting rod; and at least one spring configured to resiliently return the hinges of the first and second stabilizing connecting rods into the aligned positions;

wherein the at least one spring is a leaf spring arranged to be brought into a resiliently deformed state under a bending force (P, P') when the hinges of the first and second stabilizing connecting rods move from their generally aligned position, and to avoid being subjected to the bending force and be in one state of lesser deformation when the strut is between the retracted position and first intermediate position between the retracted position and the extended position than when said strut is between the first intermediate position and a second intermediate position between the first intermediate position and the extended position, the state of lesser deformation being a state of non-zero deformation and remaining unchanged when the strut is between the retracted position and an first intermediate position.

2. The landing gear according to claim 1, wherein the leaf spring has an end rigidly fixed to the first bracing connecting rod, and an opposite end permanently bearing on a first arm of a pivoting arm mounted rotatably free about the hinge axis of the first bracing connecting rod and of the second stabilizing connecting rod, the pivoting arm being rotatably linked to the first bracing connecting rod when the strut is between the retracted position and the intermediate position, and rotatably linked to the second connecting stabilizing rod when the strut is between the intermediate position and the extended position.

3. The landing gear according to claim 2, wherein the pivoting arm has a second arm bearing against a surface of the first bracing connecting arm when the strut is between the retracted position and the intermediate position, and bearing against a surface of the second stabilizing connecting rod when the strut is between the intermediate position and the extended position.

4. The landing gear according to claim 2, wherein the leaf spring is a metal plate having a constant thickness and a width varying linearly.

5. The landing gear according to claim 2, wherein the end of the leaf spring is rigidly fixed to the first bracing connecting rod via a fixing device comprising a base fixed onto the first bracing connecting rod and a blade support fixed to the end of the leaf spring, the blade support comprising, in a front part, a contact surface arranged to engage with a contact surface of the base and to enable a pivoting of said blade support on said base about an axis perpendicular to a longitudinal axis of the leaf spring, and comprising, in a rear part, an oblong hole arranged to be passed through by a screw in order to rigidly fix the blade support to the first bracing connecting rod and to enable the pivoting of said blade support during a screwing and an unscrewing of the screw.

6. The landing gear according to claim 2, wherein a volume occupied by the leaf spring and the pivoting arm when the strut is in the extended position is contained in a volume swept by the first bracing connecting rod when the strut passes from the retracted position to the extended position.

7. The landing gear according to claim 1, wherein the at least one leaf spring comprises two leaf springs to provide a redundancy in case of failure of one of the two leaf springs.

8. The landing gear according to claim 7, wherein the two leaf springs are identical.

9. An aircraft comprising the landing gear according to claim 1.

* * * * *